UNITED STATES PATENT OFFICE.

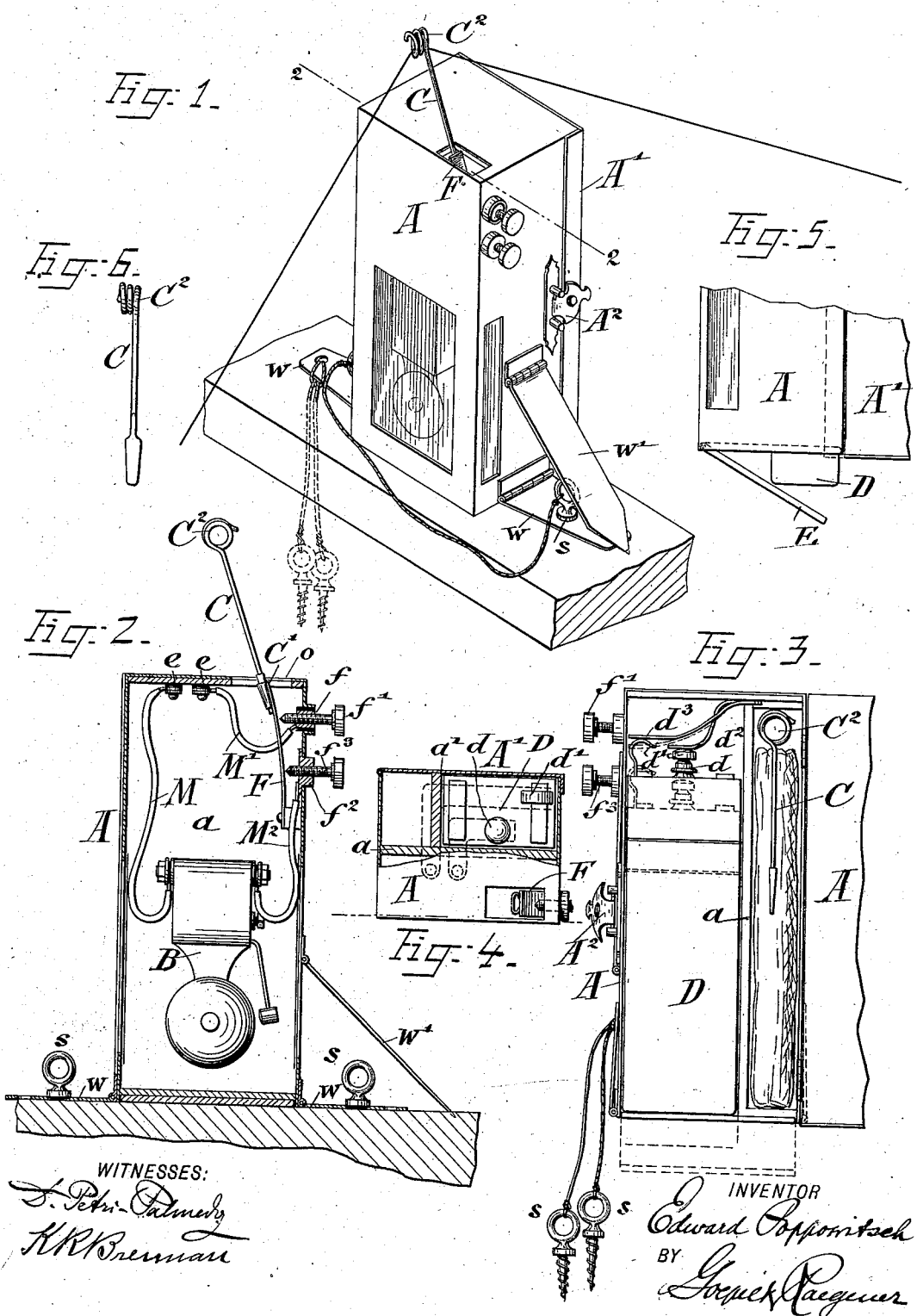

EDWARD POPPOWITSCH, OF BROOKLYN, NEW YORK.

ELECTRICAL FISHING APPARATUS.

SPECIFICATION forming part of Letters Patent No. 522,352, dated July 3, 1894.

Application filed March 22, 1894. Serial No. 504,635. (No model.)

*To all whom it may concern:*

Be it known that I, EDWARD POPPOWITSCH, a subject of the Emperor of Austria-Hungary, residing at Brooklyn, in the county of Kings and State of New York, have invented certain new and useful Improvements in Electrical Fishing Apparatus, of which the following is a specification.

This invention has reference to an improved electric fishing-apparatus, which is adapted for trolling and other fishing, and which indicates by an electric alarm device whenever the hook is taken by a fish, so that the line and fish can be drawn in; and the invention consists of a fishing apparatus, comprising a sheet-metal or other box, a battery in said box, a spring-arm provided with an eye-shaped outer end, means for adjusting the tension of said arm, a contact-screw for the spring-arm, and conducting-wires between the battery, alarm contact-screws, and spring-arm, so that as soon as the spring-arm to which the line is applied is moved and placed in contact with the contact-screw, an alarm is given, and the line is hauled in by the fisherman.

The invention consists further of certain details of construction, which will be fully described hereinafter and finally pointed out in the claims.

In the accompanying drawings, Figure 1 represents a perspective view of my improved electric fishing-apparatus, showing the same applied in position for use to the gunwale of a boat or other suitable support. Fig. 2 is a vertical longitudinal section on line 2—2, Fig. 1. Fig. 3 is a rear elevation, with the lid in open position, and showing the battery and its connection with the contact-spring. Fig. 4 is a top view of my improved electric fishing-apparatus, with a portion of the top-plate removed. Fig. 5 is a portion of the exterior box, showing the hinged compartment in which the battery is arranged, and Fig. 6 is a detail view of the detachable line-guide.

Similar letters of reference indicate corresponding parts.

Referring to the drawings, A represents the exterior box of my improved electric fishing-apparatus. The box A is made of suitable sheet-metal, and provided at one side with an opening that is covered by a plate of mica, glass or other transparent material, through which the electric-alarm device that is arranged in the box can be readily seen. The box A is divided by a central longitudinal partition $a$ into two compartments, one compartment containing the electric-alarm device B, as shown in Fig. 2.

The other compartment is divided by a partition $a'$, arranged at right-angles to the partition $a$, into a larger and a smaller compartment, the larger containing the battery D, while the smaller compartment serves for storing the chemicals, which are arranged in suitable packages in the nature of cartridges, each package containing sufficient for supplying, in connection with a suitable quantity of water, a sufficient amount of exciting liquid for filling the battery.

The detachable line-guide C is likewise stored, with the packages containing the battery-charges, in the small compartment, the rear side of the box A being closed by a hinged cover A' which is attached to the body of said box by a suitable fastening-device A², as shown in Fig. 1.

The bottom E of the compartment for the battery D is hinged, so that by opening the same, the battery can be readily moved out of or into its compartment.

The battery is provided with a detachable top, to which the zincs are applied, while the body of the battery is made of suitable glass or other acid-resisting material, into which the exciting liquid is placed, the battery being of such size as to supply a current sufficient for one trip.

When the battery is charged with the liquid, it is replaced into its compartment in the box, and moved up in the same until the bottom can be closed, so that the terminals $d$, $d'$, on the cover of the battery are made to abut against contact-springs $d^2$ $d^3$ at the top of the compartment for the battery, as shown in Fig. 3.

The contact-springs $d^2$, $d^3$, are connected by wires or metallic strips with binding-posts $e$, $e$, which are arranged at the top part of the compartment in which the electric-alarm device B is located. The posts $e$ are connected by conducting-wires M M' respectively with the electro-magnet of the alarm-device B and with an insulated screw-nut $f$ that is supported in the wall of the box A and provided with a screw-thread in which is arranged a contact-screw $f'$.

Below the contact-screw $f'$ and nut $f$ is arranged an adjusting-screw $f^3$, said adjusting-screw acting on a spring-arm F, which is attached to the wall of the box A and provided at its upper end with a socket C' into which the lower tapering end or shank of the line-guide C is inserted. The spring-arm F extends in upward direction into an opening $o$ in the top of the box A, but not beyond the same, so that there are no projecting parts which may be injured when the apparatus is packed up and carried to and fro.

The line-guide C is provided at its upper end with an eye $C^2$ that is formed by a few spiral convolutions into which the upper end is bent and through which the line is passed. The electro-magnet of the alarm-device B is also connected by a wire $M^2$ with the screw-nut $f^2$ of the adjusting-screw $f^3$, which latter serves to adjust the tension of the spring-arm F according as the device is to be set for catching large or small fish. As soon as a bite takes place, the tension of the line moves the line-guide C, which is inserted into the upper end of the spring-arm F, toward the contact-screw $f'$, so that contact is formed by which the battery-circuit is closed and the alarm-device operated. As soon as the signal is given, the line is hauled in and the fish removed from the hook. The line is then paid out again and the next bite takes place, and so on.

To the walls of the box are applied hinged wings $w$, which are provided with openings through which eye-screws $s$ are passed for attaching the box to a gunwale or other suitable support, as shown in Fig. 1. The wings $w$ are placed in line with the bottom of the box. Above the wing $w$ in front of the line-guide C is arranged a hinged and pointed brace $w'$, the point of which is pressed into the gunwale, or other part on which the apparatus is supported, so that thereby a greater resistance against sudden strains is imparted and the box supported in firmer position on its support.

The eyes of the screws $s$ are connected by strings, so that after being used the same can be unscrewed and stored in the smaller compartment of the box A, in which the charges for the battery and the line-guide are likewise stored. The hinged wings $w$ and brace $w'$ are then folded up alongside of the box, as shown in Fig. 3, so as to be taken away.

The apparatus described forms a convenient apparatus for catching fish, without being all the time at the line, the alarm indicating immediately whenever a fish is on the hook, provided that the tension of the spring-arm F is adjusted so that only an actual bite, and not the mere nibbling of the fish on the bait, produces contact and closes the circuit of the battery.

Having thus described my invention, I claim as new and desire to secure by Letters Patent—

1. The combination with an exterior storage-box, of an electric-alarm device attached therein, a battery arranged therein, a spring-arm attached to said box and provided with a line-guide, a screw for adjusting the tension of the spring-arm, and a contact-screw for forming contact with the spring-arm and closing the battery circuit, and electric connections between the battery, the alarm-device, the tension adjusting and contact-screws, substantially as set forth.

2. An electric fishing-apparatus, comprising an exterior box having a hinged cover at one side, and means for locking the same, partitions for forming a larger, intermediate and smaller compartment in said box, an electric alarm device located in a larger compartment, a battery located in the intermediate compartment, a spring-arm arranged in the larger compartment and provided with a socket at its upper end, a line-guide inserted in said socket and extending through an opening in the top of the box, a screw for adjusting the tension of the spring-arm, a contact-screw for forming contact with the spring-arm and electric connections between the battery, alarm-device and the tension and contact-screws, so that the alarm-device is rung as soon as, by the tension on the line-guide, the supporting spring-arm of the same is placed in contact with the contact-screw, substantially as set forth.

3. An electric fishing-apparatus, provided with hinged wings in line with the bottom of the apparatus and with a hinged and pointed brace above the front wing and screws for fastening the wings to a gunwale, or other support, substantially as set forth.

In testimony that I claim the foregoing as my invention I have signed my name in presence of two subscribing witnesses.

EDWARD POPPOWITSCH.

Witnesses:
PAUL GOEPEL,
K. R. BRENNAN.